United States Patent
Vrana et al.

(10) Patent No.: US 7,165,312 B2
(45) Date of Patent: Jan. 23, 2007

(54) METHOD OF ATTACHING A LOCATOR STUD ON A PANEL

(75) Inventors: John J. Vrana, Rochester Hills, MI (US); John M. Parker, Ann Arbor, MI (US); David M. Shuart, Royal Oak, MI (US)

(73) Assignee: Whitesell International Corporation, Muscle Shoals, AL (US)

( * ) Notice: Subject to any disclaimer, the term of this patent is extended or adjusted under 35 U.S.C. 154(b) by 371 days.

(21) Appl. No.: 10/670,622

(22) Filed: Sep. 25, 2003

(65) Prior Publication Data

US 2005/0025610 A1    Feb. 3, 2005

Related U.S. Application Data

(63) Continuation-in-part of application No. 10/630,060, filed on Jul. 30, 2003, now abandoned.

(51) Int. Cl.
*B21D 39/00* (2006.01)
*B23P 11/00* (2006.01)

(52) U.S. Cl. .......................... 29/509; 29/515; 29/522.1; 29/525.05; 29/525.06; 29/243.5; 403/280; 403/282; 403/285; 411/107; 411/180

(58) Field of Classification Search .................. 29/515, 29/432.1, 432.2, 509, 522.1, 524.1, 525.05, 29/525.06, 246.5, 243.53; 411/180, 181, 411/186, 188, 176, 107; 403/276, 280, 274, 403/282, 285, 176, 180, 181, 185, 188, 107
See application file for complete search history.

(56) References Cited

U.S. PATENT DOCUMENTS

| | | | |
|---|---|---|---|
| 2,486,769 A * | 11/1949 | Watson, Jr. ................. 411/180 |
| 2,707,322 A | 5/1955 | Strain et al. |
| 2,780,265 A * | 2/1957 | Brancato ..................... 411/176 |
| 4,543,701 A * | 10/1985 | Muller ....................... 29/432.1 |
| 4,555,838 A | 12/1985 | Muller |
| 4,810,143 A | 3/1989 | Muller |
| 5,020,950 A | 6/1991 | Ladouceur |
| 5,056,207 A | 10/1991 | Ladouceur |
| 5,092,724 A | 3/1992 | Muller |
| 5,140,735 A | 8/1992 | Ladouceur |
| 5,644,830 A | 7/1997 | Ladouceur et al. |
| 5,868,535 A * | 2/1999 | Ladouceur .................. 411/181 |
| 6,122,816 A | 9/2000 | Ladouceur |
| 6,491,487 B1 * | 12/2002 | Wojciechowski ........... 411/181 |
| 6,592,311 B1 * | 7/2003 | Wojciechowski et al. ... 411/107 |
| 6,647,608 B1 * | 11/2003 | Wojciechowski et al. ..... 29/515 |

* cited by examiner

*Primary Examiner*—Jermie E. Cozart
(74) *Attorney, Agent, or Firm*—Howard & Howard Attorneys, P.C.

(57) ABSTRACT

A locator stud including a shank and a flange portion integral and coaxially aligned with the shank and a bearing surface between the shank and the flange portion, a method of installation in a panel, including forming an opening in the panel, inserting the flange portion into the panel opening and driving a plunger having an opening receiving the shank, a first annular die surface deforming the bearing surface radially outwardly and a second projecting annular die surface deforming the panel radially inwardly into a concave outer surface of the flange portion and wherein the panel of the locator stud and panel assembly includes a V-shaped depression surrounding the locator stud.

18 Claims, 7 Drawing Sheets

METHOD OF ATTACHING A LOCATOR STUD ON A PANEL

RELATED APPLICATIONS

This application is a continuation-in-part application of U.S. Ser. No. 10/630,060 filed Jul. 30, 2003 now abandoned.

FIELD OF THE INVENTION

This invention relates to a locator stud or pin for attachment to a panel which may be utilized to accurately attach other elements to the panel, the method of attaching a locator stud to a panel and a locator stud and panel assembly.

BACKGROUND OF THE INVENTION

Locator studs or pins are now used in mass production applications to accurately locate one component relative to a second component. Generally, the assembly includes a plurality of locator studs attached to a panel, such as a frame member, to accurately locate a component relative to the frame member. As an example only, locator studs or pins are utilized for alignment of the control arms to the struts of a vehicle used to mount the ball joints which support the vehicle wheels. There are numerous other examples of the use of locator studs or pins in mass production applications.

As will be understood by those skilled in this art, the locator studs must be accurately positioned on the panel. Locator studs or pins include a shank or pin portion which projects from the panel and are used to locate a second component relative to the panel. The locator studs or pins, therefore, must not only be accurately located on the panel, but the shank portion must project perpendicular to the panel. It would also be desirable to attach the locator pins or studs to the panel in a mass production application without requiring welding, threading or other secondary operations. Finally, the locator stud must be firmly attached to the panel to prevent cocking or movement of the locator stud during final assembly.

The locator stud, method of assembling a locator stud to a panel and locator stud and panel assembly of this invention achieve the objects and advantages set forth above and the locator stud of this invention may be easily installed in a panel, for example, in a conventional die press or c-frame press. Other advantages and meritorious features of the locator stud and method of attaching the locator stud to a panel of this invention will be more fully understood from the following description of the preferred embodiments, the appended claims and the drawings, a brief description of which follows.

SUMMARY OF THE INVENTION

The locator stud of this invention includes a shank portion which is preferably, but not necessarily cylindrical, and a flange portion having a diameter greater than the shank portion which is integral and coaxially aligned with the shank portion. Upon installation of the flange portion of the locator stud in a panel, as described below, the shank portion projects from the panel, preferably perpendicular to the panel, for locating and assembly of a component to the panel as described above. The locator stud of this invention includes a generally radial bearing surface between the shank portion and the flange portion which, in one preferred embodiment, is concave or generally frustoconical. In one preferred embodiment of the locator stud of this invention, the end surface of the flange portion is concave or generally frustoconical, wherein the central portion is recessed having a major diameter adjacent an outer rim portion. In one preferred embodiment of the locator stud of this invention, the outer surface of the flange portion is initially concave, wherein the diameter is smaller adjacent the midportion, but in the other embodiments of the locator stud of this invention, the outer surface of the flange portion is generally cylindrical, but may include a radial rim portion at or adjacent the end of the flange portion. A further embodiment includes a radial rim portion adjacent the end of the flange portion and the outer surface of the flange portion is frustoconical having a minor diameter adjacent the rim portion, such that the outer surface of the flange portion is concave or V-shaped.

The method of installing or attaching the locator stud of this invention to a panel includes forming an opening in the panel having a diameter generally greater than the flange portion of the locator stud and inserting the flange portion of the locator stud in the panel opening. The end of the flange portion of the locator stud is supported on a die member, preferably in a lower die shoe of a die or C-frame press, and the locator stud is then installed in the panel opening by a plunger preferably attached to the upper die shoe. The plunger includes an axial opening configured to receive the shank portion of the locator stud, a first annular die surface adjacent the opening coaxially aligned with the generally radial annular surface of the locator stud and a second projecting annular die surface located opposite the panel. The method of this invention then includes driving the plunger toward the panel, receiving the shank portion in the axial opening, driving the first annular die surface against the generally radial annular surface of the locator stud, deforming the annular surface radially outwardly to engage the panel and finally, the second projecting annular die surface is driven against the panel, deforming the panel radially inwardly against an outer concave surface of the flange portion, locking the flange portion in the panel opening.

As set forth above, the outer surface of the flange portion may be initially cylindrical, wherein the outer concave surface of the flange portion is formed during the installation process by driving the first annular die surface of the plunger against the generally radial bearing surface between the shank portion and the flange portion. In another preferred embodiment of the method of this invention, wherein the outer surface of the flange portion is initially concave, as described above, and the generally radial bearing surface may be concave or generally frustoconical, the first projecting annular die surface may be flat or perpendicular to the axial bore in the plunger, wherein the method of this invention includes driving this first die surface of the plunger surface against the outer edge of the frustoconical surface, deforming the outer edge of the annular surface radially outwardly to engage the panel. Where the end surface of the flange portion is concave or frustoconical, the end surface of the flange portion is driven against the die member, simultaneously deforming the outer edge of the frustoconical surface at the end of the flange portion radially outwardly forming an outer concave surface on the flange portion which receives the panel as it is driven inwardly by the second projecting annular die surface of the plunger. The die member may also include one annular or a plurality of concentric annular die surfaces which deform the panel and the end face of the flange portion into interlocking relationship as the end of the flange portion is driven against the die member by the plunger, as described above.

As will be understood from the above description of the preferred embodiments of the locator stud and method of assembly, the locator stud and panel assembly of this invention includes a locator stud preferably having a generally cylindrical shank portion and a flange portion integral and coaxially aligned with the shank portion having a concave outer surface which is formed either during assembly or prior to assembly as described above, a panel having an opening therethrough receiving the flange portion of the locator stud including a convex surface deformed into the concave outer surface of the flange portion, preferably with the flange portion generally flush in the panel and the shank portion extending perpendicular to the panel. Where the shank portion of the locator stud includes a radial rim, the assembly includes the radial rim adjacent the end of the flange portion and panel deformed against and around the rim providing additional stability without requiring deformation of the end of the flange portion. As set forth above, the embodiments of the locator stud of this invention having a radial rim portion extending from adjacent the end of the flange portion may include a cylindrical outer surface or a concave outer surface adjacent the rim portion, wherein the concave surface is formed by a frustoconical surface having a minor diameter adjacent the rim portion, such that the outer surface of the flange portion is V-shaped. The utilization of an annular radial rim portion eliminates the requirement for deformation of the panel by the die member, resulting in a substantially flush installation of the flange portion in the panel. Where the die member includes an annular V-shaped die surface, the locator stud and panel assembly includes a V-shaped depression, preferably coaxially aligned with the depression formed by the second projecting annular die surface of the plunger. The die member may also include an inner annular projecting die surface which deforms the end of the flange portion radially outwardly improving the interlock between the panel and the flange portion of the locator stud.

Other advantages and meritorious features of the locator stud, method of assembly and locator stud and panel assembly of this invention will be more fully understood from the following description of the preferred embodiments, the appended claims and the drawings, a brief description of which follows.

DESCRIPTION OF THE PREFERRED EMBODIMENTS

Figure 1:
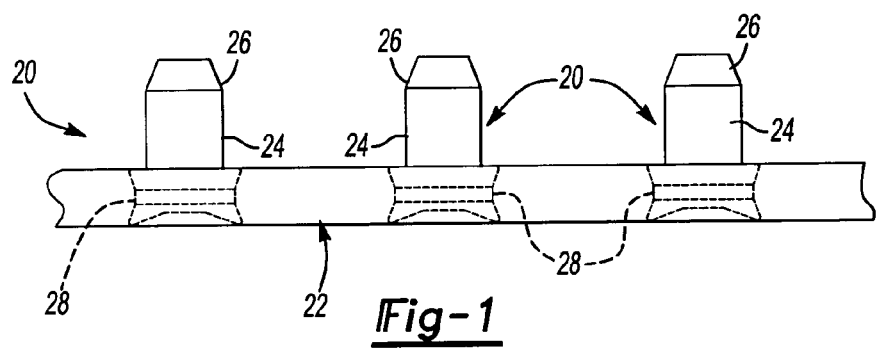
FIG. 1 is a side view of a panel having three locator studs of this invention attached to a panel.

The locator stud, method of assembly and locator stud and panel assembly of this invention will now be described in relation to four alternative embodiments of the locator stud of this invention. However, it is important to understand that the disclosed embodiments are for illustrative purposes only and the invention is not limited to the disclosed embodiments except as set forth in the appended claims. As set forth above, locator studs are now utilized to accurately locate a component on a panel. The locator studs include a shank portion which preferably projects perpendicular to the plane of the panel and the panel may include any number of locator pins as required by the application. FIG. 1 illustrates one application of this invention, wherein three locator studs 20 are installed in a panel 22. Each of the locator studs 20 include a cylindrical shank portion 24 which extends perpendicular to the plane of the panel 22 having a frustoconical end portion 26. As described in detail hereinbelow, the locator studs 20 each include a flange portion 28 which is rigidly installed in an opening in the panel 22 by the method of this invention and the installation apparatus disclosed in FIGS. 2, 4 and 5 as now described.

Figure 2:
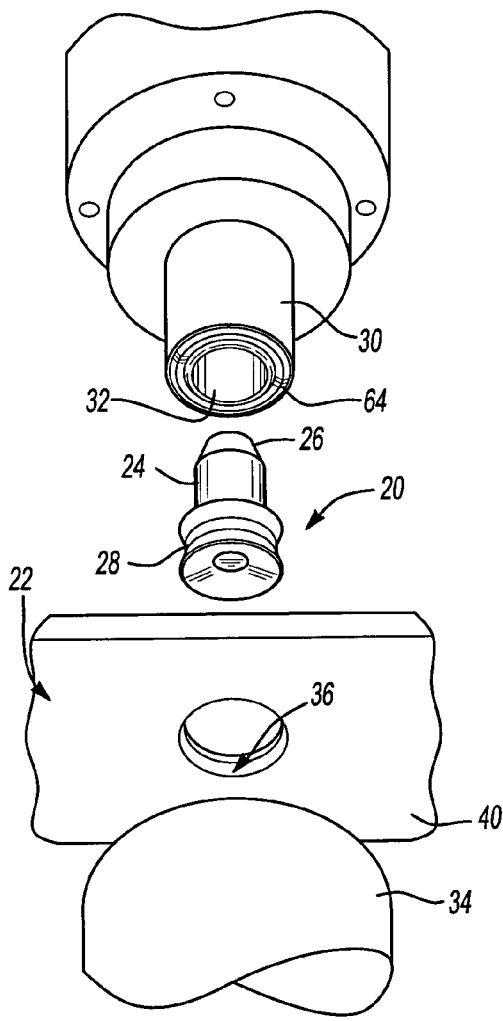
FIG. 2 is an exploded view of an installation apparatus suitable for installing the locator stud of this invention in a panel.

FIG. 2 illustrates one embodiment of an installation apparatus for installing the locator stud 20 which includes a plunger 30 having an axial bore 32 which receives the shank portion 24 of the locator stud 20 and a die member 34. As will be understood by those skilled in this art, the plunger 30 may be fixed to the upper die shoe or platen of a die or C-frame press (not shown) and the die member or die button 34 may be fixed relative to the lower die shoe, such that a locator stud or a plurality of locator studs 20 are installed with each stroke of the press.

Figure 3:
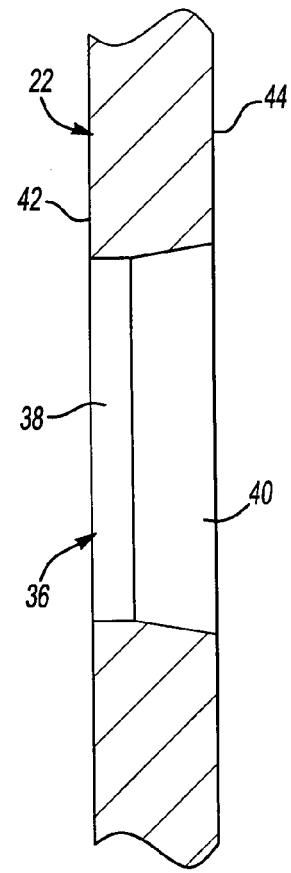
FIG. 3 is a side cross-sectional view of a panel having an opening formed therein to receive a locator stud of this invention.

The first step in the method of attaching a locator stud or pin in a panel 22 of this invention is forming an opening 36 in the panel configured to receive the flange portion 28 of the locator stud 20. As shown in FIG. 3, the opening 36 through the panel 22 preferably includes a cylindrical portion 38 opening through one face 42 of the panel 22 and a frustoconical opening 40 opening through the second or opposed face 44 of the panel. As will be understood by those skilled in this art, this configuration of an opening 36 through a panel may be formed by a punch driven against face 42 of the panel, forming the cylindrical opening 38 and the frustoconical opening 40 is formed by a break-out of the panel. It should be understood, however, that the method and locator stud and panel assembly of this invention is not limited to the configuration of the panel opening 36, although this configuration is preferred with the embodiments of the locator studs disclosed.

Figure 4:
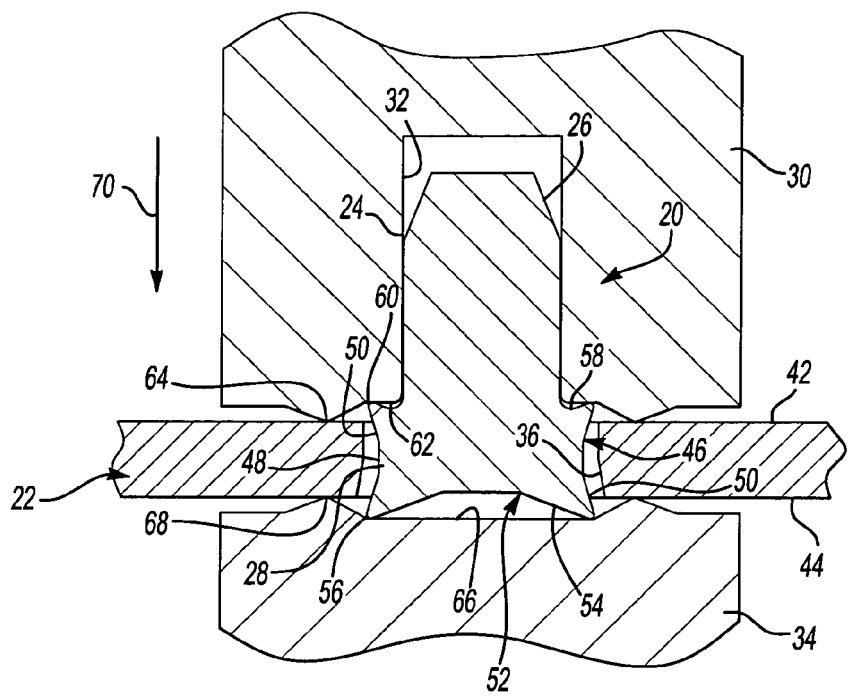
FIG. 4 is a side cross-sectional view of the installation apparatus shown in FIG. 2 during assembly of the embodiment of the locator stud of this invention shown in FIGS. 1 and 2 in a panel.
Figure 5:
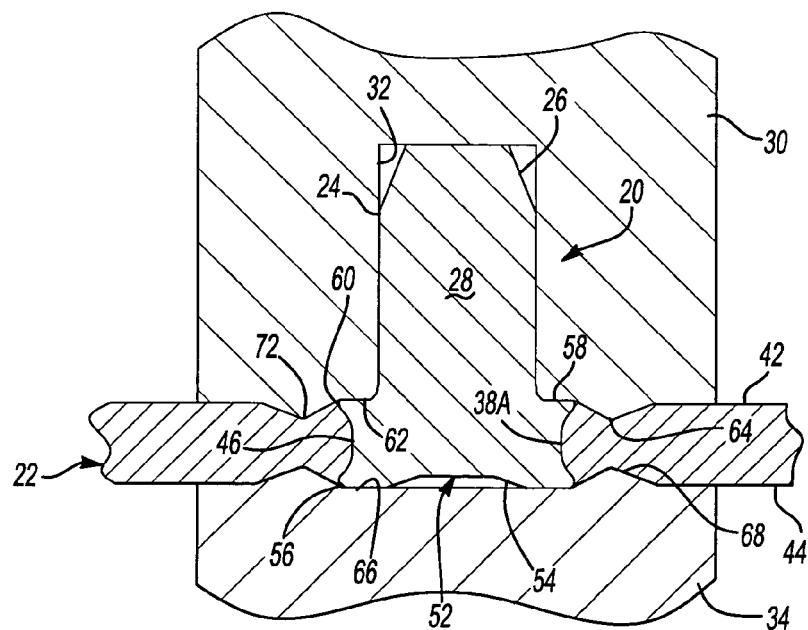
FIG. 5 is a side cross-sectional view of the installation apparatus and locator stud illustrated in FIG. 4 following installation of the locator stud in a panel.

FIGS. 4 and 5 illustrate in more detail the embodiment of the locator stud 20, plunger 30 and die member 34. In this embodiment of the locator stud 20, the outer surface 46 of the flange portion 28 is initially concave including a cylindrical midportion 48 and frustoconical surfaces 50 which are inclined outwardly from the cylindrical midportion 48 as best shown in FIGS. 4 and 5, forming a generally arcuate concave surface. The end surface 52 of the flange portion 28 of this embodiment is also concave, including a frustoconical outer surface 54 having a major diameter adjacent the outer rim 56 as shown in FIG. 4. The flange portion 28 further includes a generally radial annular bearing surface 58 between the outer surface 48 of the flange portion 28 and the shank portion 24. In this embodiment, the annular bearing surface 58 is concave or generally frustoconical having a major diameter at the outer rim 60 of the bearing surface 58. As described above, the plunger 30 includes an axial bore 32 which receives the shank portion 24 of the locator stud 20 during installation of the stud in a panel 22. The annular end surface surrounding the axial bore includes a plurality of die surfaces including a first inner annular die surface 62 adjacent the axial bore 32 coaxially aligned with the annular bearing surface 58 of the locator stud 20, between the flange portion 28 and the shank portion 24, and a second outer projecting V-shaped annular die surface 64, which coaxially surrounds the first inner annular die surface 62, aligned with the first face 42 of the panel 22. The die member 34 also includes a central die surface 66 which receives the outer rim 56 of the concave frustoconical surface 54 of the end surface 52 of the flange portion 28 and an annular V-shaped projecting die surface 68 which, in the preferred embodiment of the installation tooling, is coaxially aligned with the V-shaped second annular die surface 64 of the plunger 30 as shown in FIG. 4.

In a typical installation, the shank portion 24 is received in the axial bore 32 of the plunger 30 located in the upper die shoe of a press (not shown) and the die member or die button 34 is installed in the lower die shoe of the press with the panel 22 secured to the lower die platen and the panel opening 38 coaxially aligned with the axial bore 32 of the plunger 30. The plunger 30 is then driven toward the panel 22, as shown by arrow 70, driving the end surface 52 of the flange portion 28 against the central die surface 66, forming the locator stud and panel assembly illustrated in FIGS. 4 and 5 as now described in further detail. The first inner die surface 62 of the plunger 30 which, in this embodiment, extends perpendicular to the axial bore 32, is driven against the outer rim 60 of the flange portion 28, deforming the rim portion 60 radially outwardly and the rim portion 62 of the end surface 52 is driven against the central die surface 66, similarly deforming the outer rim portion 56 radially outwardly. Substantially simultaneously, the second projecting V-shaped annular die surface 64 of the plunger is driven against the first face 42 of the panel 22 and the outer die surface 68 of the die member 34 is driven against the opposed surface 44 of the panel 22, deforming the panel adjacent the panel opening 38 radially inwardly as the rim portions 56 and 60 are deformed radially outwardly, forming a secure and rigid mechanical interlock between the flange portion 28 and the panel 22, as shown in FIGS. 5 and 6.

Figure 6:
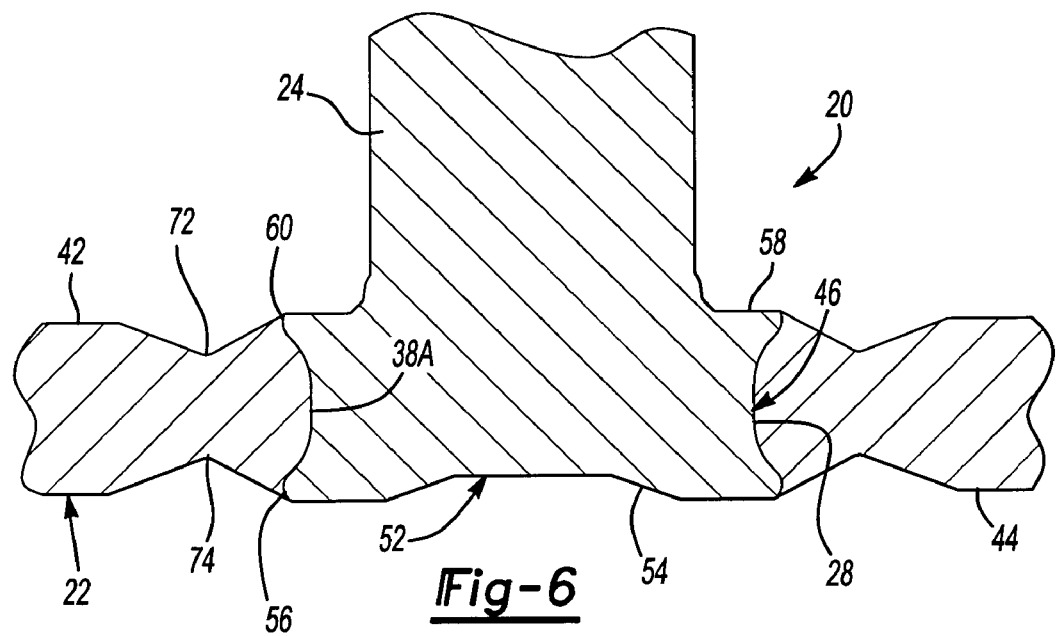
FIG. 6 is a side view of the locator stud and panel assembly formed by the method and installation apparatus shown in FIGS. 4 and 5.
Figure 7:
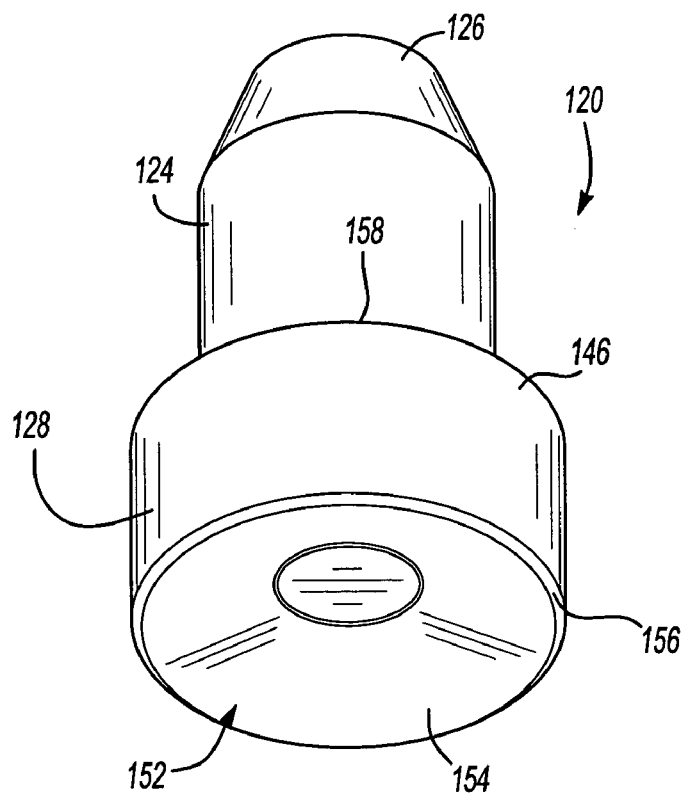
FIG. 7 is a bottom perspective view of an alternative embodiment of the locator stud of this invention.

As will be understood from the above description of the installation process or method of installing the locator stud 20 in a panel 22, the stud and panel assembly includes opposed coaxially aligned annular V-shaped depressions 72 and 74, the concave bearing surface 58 has been flattened and now extends generally perpendicular to the shank portion 24 and the surface of the panel opening is bulged inwardly as shown at 38A in FIG. 6. The panel 22 is thus entrapped in the concave outer surface 46 of the flange portion 28 between the rim portions 56 and 60 which are rounded during installation as shown in FIG. 6. The end surface 52 of the flange portion 28 is also substantially flattened as shown in FIG. 6.

Figure 8:
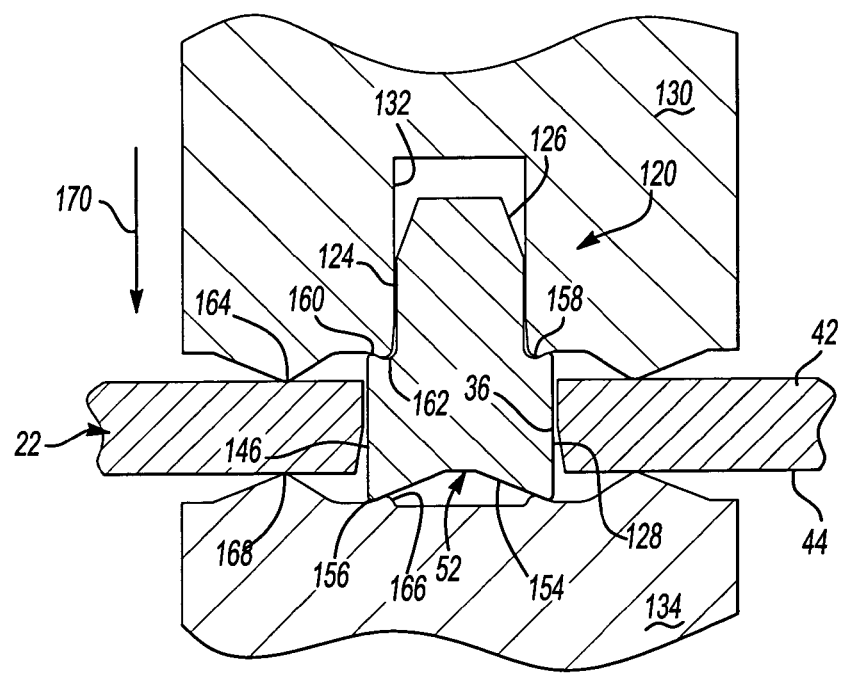
FIG. 8 is a side cross-sectional view of the locator stud illustrated in FIG. 7 in an alternative embodiment of the installation apparatus prior to assembly.
Figure 9:
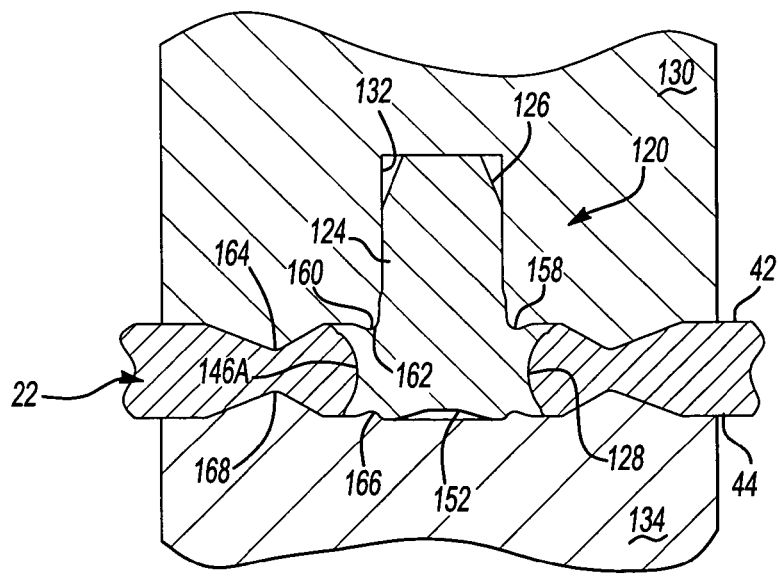
FIG. 9 is a side cross-sectional view of the locator stud and installation apparatus shown in FIG. 8 following assembly.

FIGS. 7 to 10 illustrate a second alternative embodiment of the locator stud 120 of this invention and an alternative method of installing the locator stud 120. Because many of the features of the locator stud 120 and the installation tooling disclosed in FIGS. 8 and 9 are similar, but not identical to the locator stud 20 and installation tooling disclosed in FIGS. 2, 4 and 5, the elements of the locator stud 120 and the installation apparatus are numbered in the same sequence as the locator stud 20, the plunger 30 and die member 34, except that in this embodiment, the elements are numbered in the 100 series to reduce the required disclosure and this disclosure will focus on the differences between these embodiments. The locator stud 120 includes a shank portion 124 having a frustoconical end portion 126 and a flange portion 128. However, in this embodiment, the outer surface 146 of the flange portion is initially cylindrical, rather than concave as described above. The end surface 152 of the flange portion 128 of this embodiment is preferably concave, including a frustoconical outer surface 154 having a major diameter at the outer rim 156 of the flange portion 128 as described above with reference to the locator stud 20. The annular bearing surface 158 in this embodiment is also concave or generally frustoconical as shown in FIG. 8.

As shown in FIGS. 8 and 9, the plunger 130 includes an axial bore 132 which receives the shank portion 124 of the locator stud 120 and the annular end face of the plunger includes a first inner annular bearing surface 162 adjacent the axial bore 132 and a second V-shaped projecting annular die surface 164 surrounding the first inner annular die surface 162. In this embodiment, however, the first inner annular die surface 162 is convex or generally frustoconical and generally the mirror image of the concave generally frustoconical bearing surface 158, as best shown in FIG. 8. In this embodiment, the die member 134 includes an inner annular projecting die lip 166 which receives the frustoconical surface 154 including the outer rim 156 and an outer concentric V-shaped second annular die surface 168 which, as described above, is preferably coaxially aligned with the second V-shaped annular die surface 164 of the plunger 130 as shown in FIG. 8.

Figure 10:
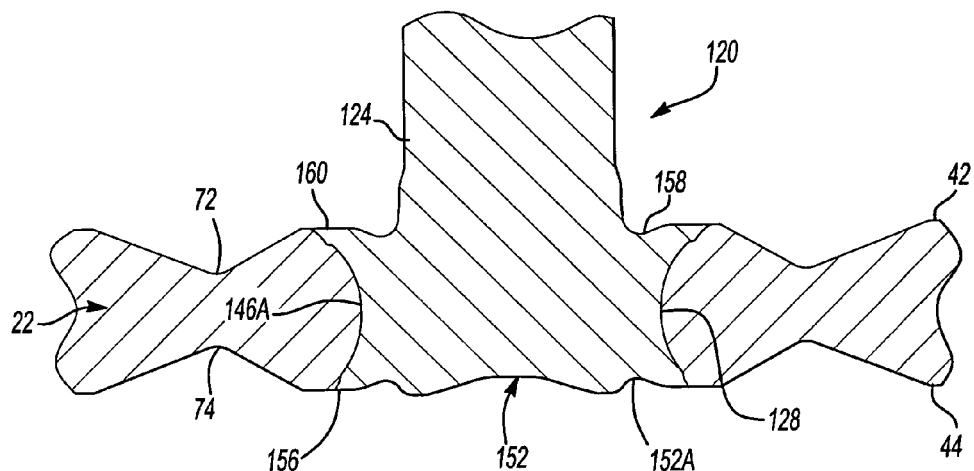
FIG. 10 is a side cross-sectional view of the locator stud and panel assembly formed by the method and installation apparatus shown in FIGS. 8 and 9.

As described above, the first step in the method of installing the locator stud 120 is to form an opening 36 in the panel 22 which is preferably configured as shown in FIG. 3. The shank portion 124 is then received in the axial bore 132 of the plunger and the plunger is driven toward the panel as shown by arrow 170 in FIG. 8. As the plunger 130 is driven toward the panel, the first inner annular die surface 162 is driven against the annular bearing surface 158, deforming the annular bearing surface 152 radially outwardly, and the annular die lip 166 is driven against the frustoconical end surface 154 of the flange portion 28, deforming the outer rim 156 radially outwardly, thereby forming a concave outer surface 146A of the flange portion 128 as shown in FIG. 9. The panel 22 is simultaneously deformed by the opposed V-shaped die surfaces 164 of the plunger 130 and 168 of the die member 138, deforming the panel adjacent the panel opening 36 radially inwardly into the concave outer surface 146A and forming a secure and rigid installation as shown in FIG. 10. As shown in FIG. 10, the panel 22 includes opposed V-shaped depressions 72 and 74 as described above. However, the bearing surface 158 has been flared outwardly to a greater extent than the bearing surface 58 shown in FIG. 6 and the end surface 152 of the flange portion 128 includes an annular depression 152A made by the inner annular die surface 166 of the die member 134 which further flares the outer rim 156, forming the concave surface 146A providing a very secure and rigid installation without the requirement for an outer concave surface on the flange portion 128 prior to installation. Thus, the embodiment of the locator stud 120 is less expensive to manufacture than the locator stud 20 described above, but provides a very secure and rigid installation.

Figure 11:
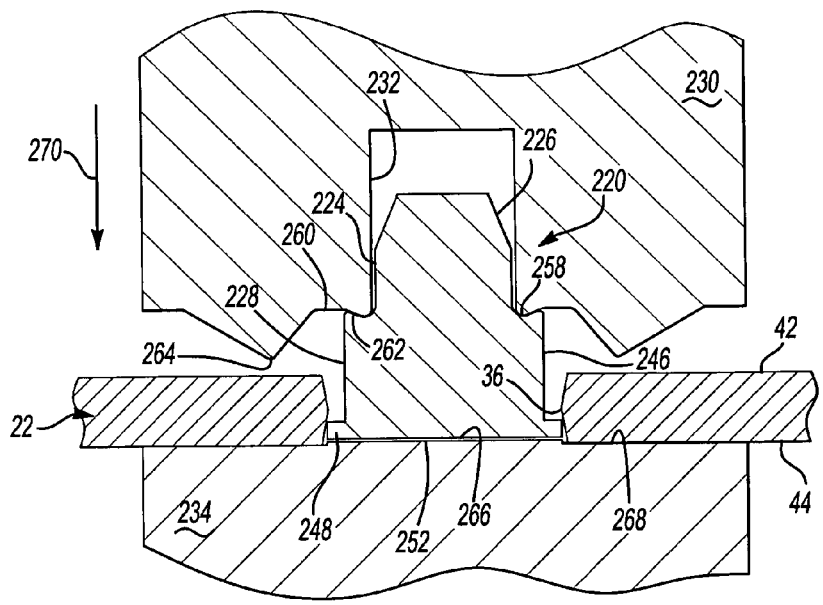
FIG. 11 is a side cross-sectional view of an alternative embodiment of the locator stud of this invention in an alternative embodiment of an installation apparatus prior to assembly of the locator stud on a panel.
Figure 12:
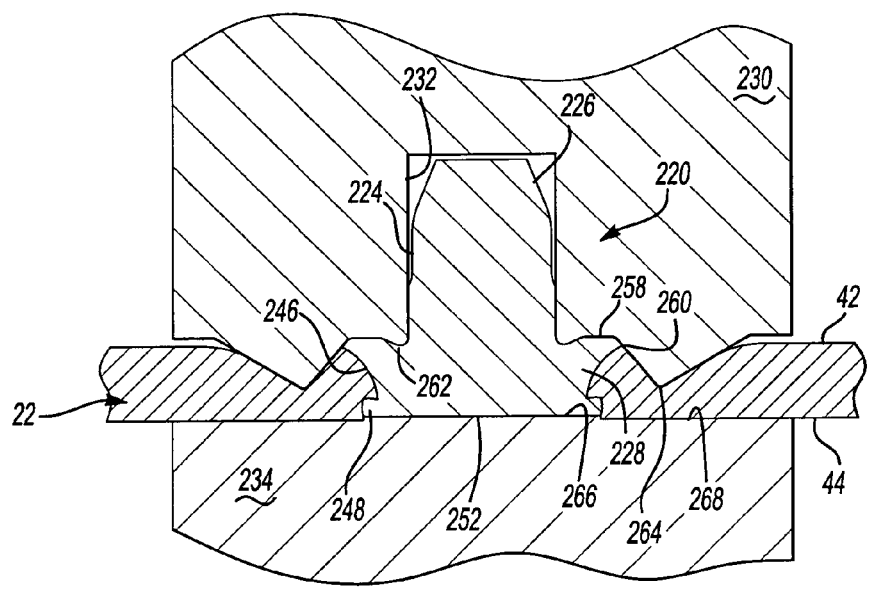
FIG. 12 is a side cross-sectional view of the locator stud and installation apparatus shown in FIG. 11 following assembly of the locator stud in a panel.
Figure 13:
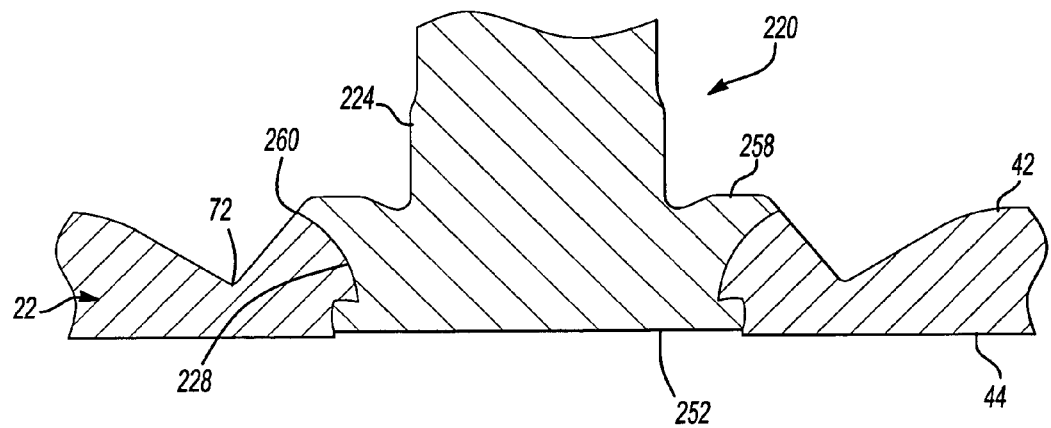
FIG. 13 is a side cross-sectional view of the locator stud and panel assembly formed by the method and apparatus illustrated in FIGS. 11 and 12.

FIGS. 11 to 13 illustrate a third alternative embodiment of the locator stud 220 and method of installation of this invention which illustrates one preferred embodiment in applications where it is desirable or necessary to limit deformation of the second face 44 of the panel 22, yet provide a substantially flush installation of the locator stud which does not project beyond the second face of the panel 44. Because the locator stud 220 and the installation tooling include many of the same features or elements as the locator studs 20 and 120 described above, the locator stud 220 and the installation tooling shown in FIGS. 11 and 12 have been numbered in the same sequence in the 200 series to reduce the required description for a full understanding of this embodiment of the invention.

The locator stud 230 includes a cylindrical shank portion 224 having a frustoconical end surface 226 and a flange portion 228 which is integral and coaxially aligned with the shank portion 224 having a diameter greater than the shank portion 224. In this embodiment, the outer surface 246 of the flange portion 228 is generally cylindrical but includes a radial cylindrical rim portion 248 adjacent the planar end face 252. The annular bearing face 258 between the flange portion 228 and the shank portion 224 is concave or generally frustoconical. Thus, the locator stud 220 differs from the locator stud 120 described above in that the end face 252 is planar, rather than concave, and the flange portion 228 includes a radial cylindrical rim portion 248.

The plunger 230 includes an axial bore 232 which receives the shank portion 224 of the locator stud 220 as described above, and the annular end of the plunger includes a first inner projecting die surface 258 adjacent the cylindrical bore 232 and a second annular V-shaped die surface 264 surrounding the first annular die surface 262. As described above with reference to FIG. 8, the first annular die surface 262 is convex or generally frustoconical and a mirror image of the concave bearing surface 262 of the locator stud 220. It should be noted, however, that in this embodiment of the plunger 230, the second annular die surface 264 projects further from the annular end face of the plunger and has a steeper angle adjacent the axial opening 232. The die member 234 in this embodiment has a generally planar end face 266 which is raised slightly above the annular end face 268 of the die member 234.

As described above, the plunger is driven toward the panel 22 as shown by arrow 270, driving the locator stud 220 to first engage the die surface 266 and the first annular convex die surface 262 is then driven against the concave annular bearing surface 258, deforming the outer rim portion 260 radially outwardly as shown in FIG. 12 and the second annular V-shaped die surface 264 is then driven into the panel, deforming the panel adjacent the panel opening 36 radially inwardly into the annular concave surface 246 formed in the outer surface of the flange portion 228 and against the radial rim portion 248. The resultant locator stud and panel assembly illustrated in FIG. 13 includes the locator stud 220 having a shank portion 224 projecting from the panel 22 perpendicular to the plane of the panel, an end face 252 which is slightly recessed below the plane of the second face 44 of the panel forming a flush installation without deformation of the second face 44 of the panel. However, the first face 44 of the panel includes a deep V-shaped annular recess 72 surrounding the locator stud 220 providing a rigid and secure assembly.

Figure 14:
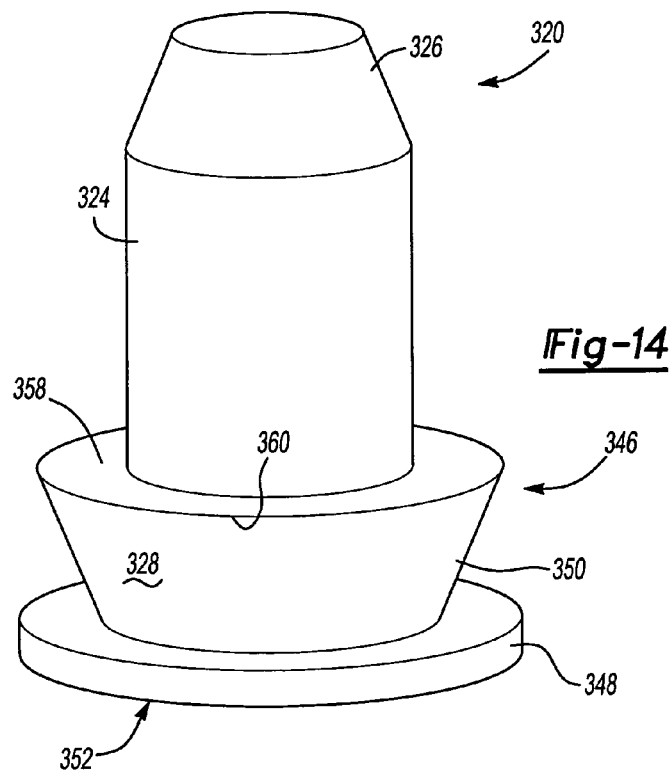
FIG. 14 is a side perspective view of an alternative embodiment of the locator stud of this invention.
Figures 15, 16:
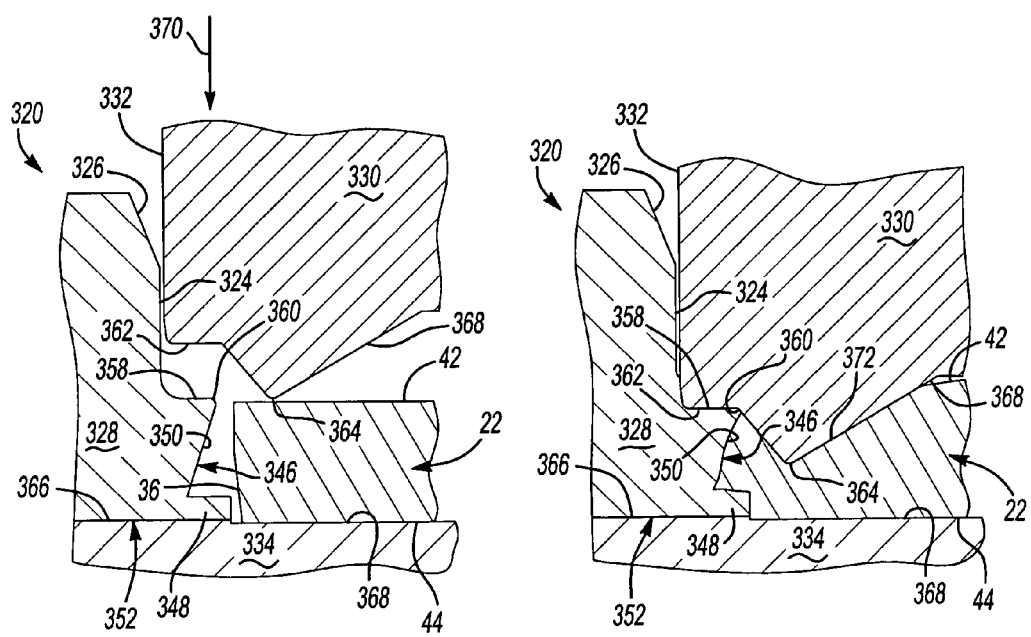
FIG. 15 is a side cross-sectional view of the locator stud illustrated in FIG. 14 in an alternative embodiment of the installation apparatus prior to assembly.
FIG. 16 is a side cross-sectional view of the locator stud and installation apparatus shown in FIG. 14 following assembly.

FIG. 14 illustrates a fourth alternative embodiment of the locator stud 320 of this invention and FIGS. 15 and 16 illustrate an alternative method of installation of the locator stud 320 and modified installation apparatus or tooling for this method of installation. As described further below, the locator stud 320 is similar, but not identical, to the locator stud 220 described above for applications where it desirable or necessary to avoid deformation of the second face 44 of the panel 22, but provides a fully flush installation and improved integrity of the locator stud and panel assembly, including improved push-off and pull-through strength. In this embodiment, the locator stud 320 best shown in FIG. 14 includes a cylindrical shank portion 324 having a frustoconical end portion 326 and a flange portion 328 integral and coaxially aligned with the shank portion 324 having a diameter greater than the shank portion 324 as described above with relation to all of the embodiments of the locator stud of this invention. In this embodiment of the locator stud 320, the outer surface 346 of the flange portion 328 is concave including a radial rim portion 348 adjacent the end 352 of the flange portion, wherein the end 352 is flat and perpendicular to the longitudinal axis of the shank portion 324 as described above with regard to the locator stud 220 shown in FIGS. 11 and 12. However, in this embodiment of the locator stud 320, the outer surface 350 is frustoconical having a minor diameter adjacent the radial rim portion 348 and a major diameter at the outer rim 360. Thus, the combination of the radial rim 348 and the frustoconical surface 350 is concave for receipt of the panel 22 described below with regard to FIGS. 15 and 16. Further, the radial surface 358 in this embodiment of the locator stud 320 is perpendicular to the longitudinal axis of the shank portion 324 rather than concave or frustoconical as described above with regard to the locator stud 220. However, because many of the features or elements of the locator stud 320 are the same or similar to the locator studs previously described, particularly the locator stud 220, and the installation apparatus shown in FIGS. 15 and 16 are similar to the installation apparatus previously described, the locator stud 320, plunger 330 and die member 334 are numbered in the same sequence as previously described, but in the 300 series to reduce the required description for a full understanding of this embodiment of the invention.

As shown in FIG. 15, the plunger 330 includes a first inner die surface 362 adjacent the axial opening 332 and a concentric annular V-shaped second projecting die surface 364. In this embodiment of the plunger 330, however, the inner annular die surface 362 is perpendicular to the longitudinal axis of the axial bore 332. The die member 334 may be identical to the die member 234, including a central die surface 366 which receives the end 352 of the flange portion 328 and an annular surface 368 which receives the panel 22. In this embodiment, the circular central die surface 366 is raised slightly above the annular surface 368 surrounding the central surface 366 to ensure a "flush mounting" of the flange portion relative to the second surface 44 of the panel 22 as described further below.

As described above, the method of installing the locator stud 320 of this invention first includes forming an opening 36 in the panel 22 which is preferably a configured opening as shown in FIG. 3. The panel 22 is then received on the annular die surface 368 and preferably clamped to the lower die shoe (not shown). The plunger 330 is then driven toward the panel 22, first receiving the shank portion 324 in the axial bore or opening 332 as shown in FIG. 15. In a conventional installation apparatus, the locator stud 320 will be received in the axial bore 332 prior to installation and the plunger 330 then drives the locator stud 320 toward the die member 334 as will be understood by those skilled in this art. FIG. 15 is therefore simplified for ease of understanding.

FIG. 16 illustrates the locator stud 320 and panel assembly formed by the method of this invention and the final orientation of the plunger 330 relative to the locator stud 320, panel 22 and die member 334. As will be understood from FIG. 16, the first inner annular die surface 362 of the plunger 330 is driven against the radial bearing surface 358 of the locator stud 320 deforming the flange portion radially outwardly, the second annular V-shaped die surface 364 is substantially simultaneously driven against the face 42 of the panel 22, simultaneously deforming the outer rim 360 of the flange portion 328 radially outwardly and the panel surrounding the panel opening 36 radially inwardly, driving the panel around the radial rim portion 348 and into the V-shaped concave outer surface of the flange portion 328 forming a very secure locator stud and panel assembly as shown in FIG. 16. It should be noted that the flange portion 328 is substantially flush with the panel 22, wherein the radial surface 358 is spaced below the plane of the first panel surface 42 and the end of the stud 352 is actually spaced within the opposed second surface 44 of the panel.

As will be understood by those skilled in this art, various modifications may be made to the embodiments of the locator stud 20, 120 and 220 of this invention, the method of attaching or installing the embodiments of the locator stud in a panel and the locator stud and panel assembly of this invention within the purview of the appended claims. For example, the shank portion 24, 124 and 224 may be any suitable configuration depending upon the application. The outer surface of the flange portion 28, 128 and 228 may also be any suitable configuration including polygonal and the concave end surface 52, 152 may be conical, rather than frustoconical or hemispherical, although a generally frustoconical surface is more easily formed. The locator studs may also include anti-rotation means or features preventing rotation of the locator stud in the panel where the application requires that the locator stud not rotate in the panel. As set forth above, the outer surface of the flange portion may be polygonal, thereby preventing rotation of the locator stud in the panel. Alternatively, in the embodiments of the locator stud 220 illustrated in FIGS. 11 to 13 and 320 illustrated in FIGS. 14 to 16, the annular surface of the radial rim portion 248 or 348 surrounding the outer surface 246 of the locator stud 220 or the frustoconical surface 350 of the stud 320 may include a plurality of spaced projecting anti-rotation ribs (not shown) which are driven into the panel face 44 during installation, preventing rotation of the locator stud in the panel. The radial ribs, for example, may have a triangular cross-section sloping toward the outer surface 246 of the locator stud 230 or 346 of the locator stud 320 and an inclined flat or rectangular top face. The radial ribs are then driven into the surface 44 of the panel, preventing rotation of the locator stud relative to the panel. Finally, the shape of the annular end of the plunger 30, 130 and 230 and the die member or die button 34, 134 and 234 will depend upon the application and the configuration of the end surface of the locator stud.

The invention claimed is:

1. A method of attaching a locator stud on a panel comprising the following steps:

forming a locator stud including a shank portion at one end and a solid flange portion at an opposed end integral with and coaxially aligned with said shank portion, said solid flange portion having a diameter greater than said shank portion, a radial annular bearing surface surrounding said shank portion and an end face opposite said radial annular bearing surface;

forming an opening in said panel with said opening having a diameter greater than said flange portion of said locator stud;

inserting said solid flange portion of said locator stud in said panel opening with said radial annular bearing surface projecting through one end of said panel opening and said end face of said solid flange portion projecting through an opposed end of said panel opening;

driving a plunger toward said panel, said plunger including an opening receiving said shank portion, a first annular die surface surrounding said opening of said plunger coaxially aligned with said annular bearing surface, said first annular die surface deforming said annular bearing surface radially outwardly against said panel, and said plunger including second projecting annular die surface surrounding said first annular die surface against said panel surrounding said panel opening, said projecting second annular die surface deforming said panel radially inwardly against an outer concave surface of said flange portion, locking said flange portion in said opening of said panel.

2. The method of attaching a locator stud on a panel as defined in claim 1, wherein said solid flange portion of said locator stud includes a radial rim portion adjacent said end face of said flange portion, said method including driving said second annular die surface of said plunger against said panel, deforming said panel radially inwardly against radial rim portion, forming a substantially flush installation of said flange portion of said locator stud in said panel.

3. The method of attaching a locator stud on a panel as defined in claim 1, wherein said radial annular bearing surface of said flange portion of said locator stud is concave and said first annular die surface of said plunger is convex, said method including driving said convex first annular die surface of said first annular die surface against said concave surface of said annular bearing surface, deforming said concave surface radially outwardly and forming said outer concave surface of said flange portion overlying a surface of said panel at said panel opening.

4. The method of attaching a locator stud on a panel as defined in claim 3, wherein said flange portion of said locator stud includes a radial rim portion adjacent said end face of said flange portion, wherein said method includes driving said second projecting annular die surface of said plunger against said panel, deforming said panel radially inwardly against said radial rim portion.

5. The method of attaching a locator stud on a panel as defined in claim 1, wherein said end face of said solid flange portion of said locator stud is a concave generally conical face having a major diameter adjacent an outer surface of said flange portion, said method including driving said concave generally conical end face of said flange portion against a die member, deforming said outer surface of said concave generally conical end face radially outwardly, thereby forming said outer concave surface of said flange portion.

6. The method of attaching a locator stud on a panel as defined in claim 5, wherein said die member includes an annular die surface having a diameter greater than said flange portion, said annular die surface of said die member driven against said end face of said flange portion and deforming said panel radially inwardly against said outer concave surface of said flange portion.

7. The method of attaching a locator stud on a panel as defined in claim 6, wherein said die member includes a projecting annular die surface having a diameter greater than said flange portion and said second projecting annular die surface of said plunger has a diameter generally equal to said projecting annular die surface of said die member and coaxially aligned therewith, wherein said method includes driving said plunger toward said panel, and driving said end face of said flange portion against said die member, driving said second projecting annular die surface of said plunger against said panel and said panel against said coaxially aligned projecting annular die surface of said die member, thereby deforming coaxially aligned annular depressions into opposed sides of said panel surrounding said flange portion of said locator stud.

8. The method of attaching a locator stud on a panel as defined in claim 1, wherein said outer surface of said flange portion is generally cylindrical prior to installation of said locator stud in said panel, and said method including deforming said outer surface of said flange portion into said outer concave surface receiving said panel.

9. The method of attaching a locator stud on a panel as defined in claim 8, wherein said flange portion includes a radial rim portion adjacent an end of said flange portion and said outer concave surface of said flange portion is formed by said second projecting annular die surface and said radial rim portion.

10. The method of attaching a locator stud on a panel as defined in claim 1, wherein said solid flange portion includes a radial rim portion adjacent said end face of said flange portion and said outer surface of said flange portion including a frustoconical outer surface extending from adjacent said radial rim portion radially outwardly having a minor diameter adjacent said radial rim portion, said method including deforming said panel radially inwardly between said radial rim portion and said frustoconical outer surface.

11. A method of attaching a locator stud on a panel comprising the following steps:

forming a locator stud including a cylindrical shank portion at one end and a solid flange portion at an opposed end integral with and coaxially aligned with said shank portion, said solid flange portion having a diameter greater than said shank portion, a radial annular bearing face surrounding said shank portion and a concave generally frustoconical end face opposite said radial annular bearing surface, said conical generally frustoconical end face including a generally conical surface extending inwardly from an outer rim of said end face;

forming an opening in said panel with said opening having a diameter generally greater than said flange portion of said locator stud;

inserting said flange portion of said locator stud in said panel opening with said radial annular bearing surface projecting through one end of said panel opening adjacent a first face of said panel and said concave generally frustoconical end face of said flange portion projecting through an opposed end said panel opening adjacent a second face said panel;

driving said outer rim of said concave generally frustoconical surface of said end face of said solid flange portion against a die member, deforming said outer rim radially outwardly against said panel, entrapping said panel; and driving a plunger toward said panel including an opening receiving said shank portion of said locator stud and a first annular die surface surrounding said opening of said plunger coaxially aligned with said radial annular bearing surface, said first annular die surface deforming said radial annular bearing surface radially outwardly against said panel.

12. The method of attaching a locator stud on a panel as defined in claim 11, wherein said radial annular bearing surface of said flange portion of said locator stud is concave and said first projecting annular die surface of said plunger is convex, said method including driving said convex surface of said first projecting annular surface against said concave surface of said annular bearing surface, deforming said concave surface radially outwardly overlying a surface of said panel at said panel opening.

13. The method of attaching a locator stud on a panel as defined in claim 11, wherein said solid flange portion includes a frustoconical outer surface having a major diameter adjacent an outer surface of said radial annular bearing surface and said rim portion of said end face and a minor diameter at a midportion of said outer surface, said method including deforming said panel radially inwardly against said frustoconical outer surface of said flange portion.

14. A locator stud and panel assembly, comprising: a locator stud including a generally cylindrical shank portion at one end of said locator stud and a solid radial flange portion integral and coaxially aligned with said shank portion at an opposed end of said locator stud, said solid radial flange portion having a diameter greater than said shank portion and including a radial annular bearing surface surrounding said shank portion having an outer rim, a concave generally frustoconical end face having an outer rim, and a concave outer surface having a major diameter adjacent said outer rim of said radial annular bearing surface and said outer rim of said concave generally frustoconical end face and a minor diameter adjacent a midportion of said outer surface, and a panel having a thickness generally equal to an axial length of said solid flange portion of said locator stud having an opening therethrough receiving said flange portion of said locator stud and including a convex inner surface deformed into said concave outer surface of said solid flange portion with said flange portion generally flush in said panel and said shank portion projecting from said panel perpendicular to said panel.

15. The locator stud and panel assembly as defined in claim 14, wherein said flange portion of said locator stud includes a radial rim portion adjacent an end of said flange portion and said panel is deformed into and around said radial rim portion.

16. The locator stud and panel assembly as defined in claim 14, wherein said panel includes a V-shaped annular depression in one surface of said panel surrounding said flange portion.

17. The locator stud and panel assembly as defined in claim 14, wherein said panel includes coaxially aligned V-shaped annular depressions formed into opposed surfaces of said panel.

18. The locator stud and panel assembly as defined in claim 14, wherein said concave outer surface of said flange portion includes frustoconical surfaces adjacent radial rim portions.

* * * * *